Patented Oct. 14, 1941

2,259,409

UNITED STATES PATENT OFFICE 2,259,409

PROCESS FOR REACTIVATING DESULPHURIZING MASSES

Wilhelm Wenzel, Leuna, and Erich Hayek, Merseburg, Germany, assignors, by mesne assignments, to Walter H. Duisberg, New York, N. Y.

No Drawing. Application May 24, 1939, Serial No. 275,468. In Germany June 3, 1938

2 Claims. (Cl. 23—148)

The present invention relates to a process for reactivating desulphurizing masses.

For the desulphurization of gases or liquids, in particular for the removal of hydrogen sulphide and also organically combined sulphur, there are used inter alia oxidic substances which are capable of binding sulphur and which can be reactivated by heating with an oxygen-containing gas. For example there may be used for the said purpose the oxides of magnesium, aluminium, iron and in particular of zinc. The reactivation is usually carried out by roasting the mass with a current of air. Masses reactivated in this way, however, in many cases, do not immediately show their original activity when used again, but only show their original activity after a certain interval. It has already been proposed also to use oxygen instead of air for the reactivation. In this case, however, there is the danger of too strong an evolution of heat, which leads to injury to the mass.

We have now found that the said drawbacks do not arise and that an excellent reactivation is obtained provided the oxygen content of the gas is increased during the reactivation process, so that a treatment with a gas rich in oxygen and having a considerably higher oxygen content than air follows the treatment with a gas poorer in oxygen. For example the exhausted purification mass may be first treated with a mixture of nitrogen and oxygen containing from about 5 to 10 per cent of oxygen and later, after a large proportion of the sulphur contained in the purification mass has been roasted off, with a gas mixture containing for example 50 per cent of oxygen or with a gas mixture even richer in oxygen, as for example industrial or practically pure oxygen having an oxygen content of 90 per cent or more. The oxygen content of the gas poor in oxygen initially employed may also be gradually increased by the addition of gases richer in oxygen or of oxygen itself.

Any desired pressure may be maintained during the reactivation. During the course of the reactivation, the gases having different oxygen contents may be used under the same or different pressures. For example it may be advantageous to accelerate the reactivation by first roasting off a considerable part of the sulphur with gases poor in oxygen under atmospheric pressure and then carrying out the further treatment with oxygen under continually increasing pressure, for example until the pressure reaches 10 atmospheres.

The temperature to be maintained is mainly dependent on the nature of the purification mass to be worked up. In the case of masses containing zinc oxide, it will generally speaking lie between 600° and 900° C. Any other desired treatment of the purification mass may precede or follow the reactivation.

The following example will further illustrate how the said invention may be carried out in practice but the invention is not restricted to this example.

Example

An exhausted zinc oxide desulphurization mass, which has been used for desulphurizing watergas down to a sulphur content of about 0.1 milligram per cubic meter, is heated at about 670° C. first in a mixture of nitrogen and oxygen having an oxygen content of 10 per cent and then in a current of air, the entire treatment occupying 6 hours. After sulphur compounds can no longer be detected in the escaping gas, the mass is again used for the desulphurization of watergas. The purified watergas contains on the first day on an average 5 milligrams of sulphur per cubic meter and on the second day 2 milligrams of sulphur per cubic meter. It is only after use for four days that the mass regains its original purification power and the purified watergas then contains only 0.1 milligram of sulphur per cubic meter.

If on the other hand in accordance with our invention the reactivation be carried out at the said temperature while first heating the mass for 4 hours with a gas containing 10 per cent oxygen and then for 2 hours in a current of 98 per cent oxygen, the mass has its original optimum activity as regards watergas immediately after its reactivation.

An equally good result is obtained by commencing the reactivation with a mixture of nitrogen and oxygen containing 5 per cent of oxygen and gradually increasing the oxygen content to 90 per cent.

What we claim is:

1. A process for reactivating zinc oxide which has been sulphurized by use for purifying a gas containing sulphur compounds, by an oxidizing treatment with a gas containing oxygen at temperatures between about 600° and 900° C., which consists in treating the mass first with a gas containing less oxygen than air and then with a gas having a higher oxygen content than air so that the treatment is completed with a gas containing at least 50 per cent of oxygen.

2. A process for reactivating zinc oxide which has been sulphurized by use for purifying a gas containing sulphur compounds, by an oxidizing treatment with a gas containing oxygen at temperatures between about 600° and 900° C., which consists in commencing the treatment with a gas containing less oxygen than air and gradually increasing the percentage of oxygen in the gas to a content of at least 50 per cent of oxygen.

WILHELM WENZEL.
ERICH HAYEK.